(12) United States Patent
Campbell et al.

(10) Patent No.: US 7,416,491 B2
(45) Date of Patent: Aug. 26, 2008

(54) INTERNAL ABSORBER FOR A SHAFT ASSEMBLY

(75) Inventors: Craig Andrew Campbell, West Bloomfield, MI (US); Robert Genway-Haden, Rochester Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 12 days.

(21) Appl. No.: 11/018,763

(22) Filed: Dec. 21, 2004

(65) Prior Publication Data

US 2007/0099713 A1    May 3, 2007

(51) Int. Cl.
*F16F 7/108* (2006.01)
(52) U.S. Cl. .................................. 464/180; 188/188
(58) Field of Classification Search .............. 464/127, 464/180; 188/378, 379; 180/381
See application file for complete search history.

(56) References Cited

U.S. PATENT DOCUMENTS

| 2,586,043 | A | * | 2/1952 | Hodgson et al. | |
|---|---|---|---|---|---|
| 4,392,681 | A | * | 7/1983 | Raquet | 188/379 X |
| 4,739,702 | A | * | 4/1988 | Kobler | |
| 6,312,340 | B1 | * | 11/2001 | Gassen et al. | 464/180 |
| 6,623,365 | B1 | * | 9/2003 | Maretzke et al. | 464/180 |
| 2006/0169557 | A1 | | 8/2006 | Goetchius | |

* cited by examiner

*Primary Examiner*—Greg Binda
(74) *Attorney, Agent, or Firm*—Jennifer M. Brumbaugh; Mick A. Nylander

(57) ABSTRACT

An absorber for use within a shaft assembly of a vehicle is disclosed. The absorber includes at least one cantilever device and at least one constrained layer device. Both devices are disposed within a tube. The absorber is capable of being tuned to specific frequencies and capable of controlling the amount of damping within the shaft assembly. Also disclosed is a shaft assembly having a generally tubular shaft. Disposed within the tubular shaft is the absorber having at least one cantilever device and at least one constrained layer device.

19 Claims, 5 Drawing Sheets

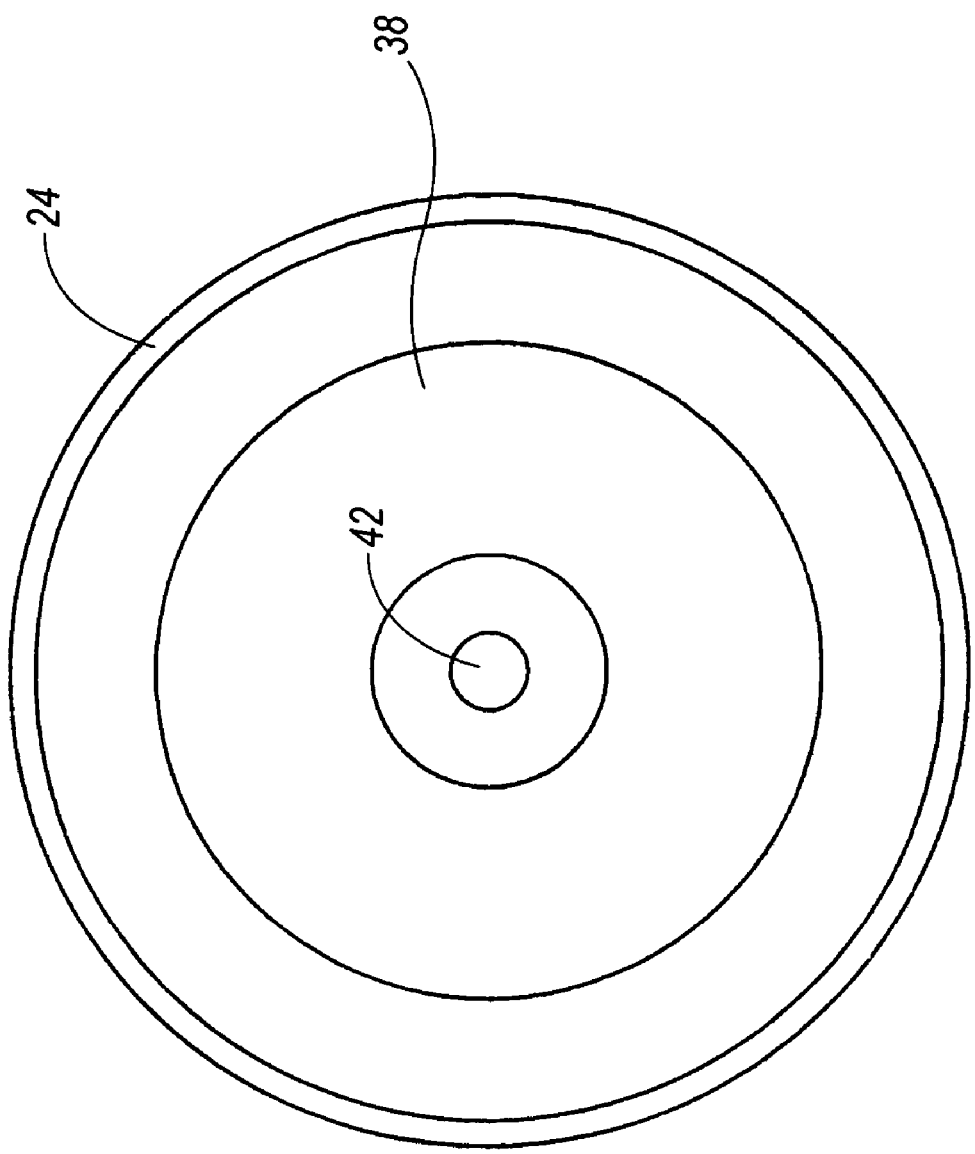

US 7,416,491 B2

INTERNAL ABSORBER FOR A SHAFT ASSEMBLY

FIELD OF THE INVENTION

The present invention generally relates to an absorber of a shaft assembly, and more particularly, relates to an absorber having a cantilever device and a constrained layered damping device.

BACKGROUND

There generally are four types of automotive driveline systems. More specifically, there exists a full-time front wheel drive system, a full-time rear wheel drive system, a part-time four-wheel drive system and an all-wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respective driven wheels to rotate at different speeds. For example, when turning, the outside wheels generally rotate faster than the inside wheels and the front wheels generally rotate faster than the rear wheels.

Driveline systems also include one or more constant velocity joints (CVJ). Such joints, which include by way of example and not limitation, the plunging tripod type, a high speed fixed type, along with any other known types are well known to those skilled in the art and are employed where transmission of a constant velocity rotary motion is desired. A typical driveline system for a rear wheel or all-wheel drive vehicle, for example, incorporates one or more constant velocity joints to connect a pair of front and rear propeller shafts (propshafts). The propshafts transfer torque from a power take-off unit generally located about a front axle of the vehicle to a rear driveline module generally located about a rear axle of the vehicle. Similarly, a driveline system for a front wheel drive vehicle incorporates one or more constant velocity joints to transfer torque from the power take-off unit to the propshaft(s).

At certain rotational speeds and resonant frequencies the above referenced propshafts typically exhibit unbalanced rotation and thus undesirable vibrations. These vibrations traditionally result in bending or torsional forces within and along the length of the respective propshaft. Such bending or torsional forces as a result of the unbalanced rotation are neither desirable nor suitable in the operation of the driveline systems of most vehicles.

Accordingly, various dynamic dampers or mass dampers are utilized to suppress the undesirable vibrations that are induced in the rotary propshaft due to the unbalanced rotation. These dampers are often installed or inserted directly onto or into the propshaft. The dampers are designed to generate a prescribed vibrational frequency adjusted to the dominant frequency of the undesired vibrations. The damper converts or transfers the vibrational energy of the propshaft to the damper by resonance, and eventually absorbs the vibrational energy of the propshaft. Therefore, the damper attempts to cancel or negate the vibrations that are induced onto or caused by the rotary propshaft in normal operation of the driveline system of the vehicle.

Many dampers generally include a mass member disposed between a pair of ring-shaped fixing members and a pair of connecting members. The connecting members connect the ends of the fixing members to the mass members. However, many of these traditional dampers are not easily tunable to specific frequencies and have difficulty controlling damping without extensive redesign of the damper and the propshaft for each automotive vehicle driveline system. Further, many traditional dampers are developed for installation directly into the rotary propshaft. However, these dampers are not capable of being properly centered or aligned within the propshaft to create the desired damping effect.

Therefore, there is a need in the art for an improved internal absorber. There also is a need in the art for an internal absorber that uses both cantilever masses and constrained layer damping to create a dampening effect. There also is a need in the art for an internal absorber that is simple to install and modify to match specific frequencies and dampening levels of various vehicle driveline systems.

SUMMARY OF THE INVENTION

The inventors of the present invention have recognized these and other problems associated with traditional internal absorbers. To this end the inventors have developed an absorber for use in a shaft assembly that includes at least one cantilever device and at least one constrained layer damping device. The absorber is disposed within a tube of the shaft assembly.

Other features of the present invention will become apparent from the subsequent description, taken in conjunction with the accompanying drawings.

BRIEF DESCRIPTION OF THE DRAWINGS

The present invention will now be described, by way of example, with reference to the accompanying drawings, in which:

FIG. 3 is an end view of the shaft assembly according to the present invention;

DETAILED DESCRIPTION

Figure 1:
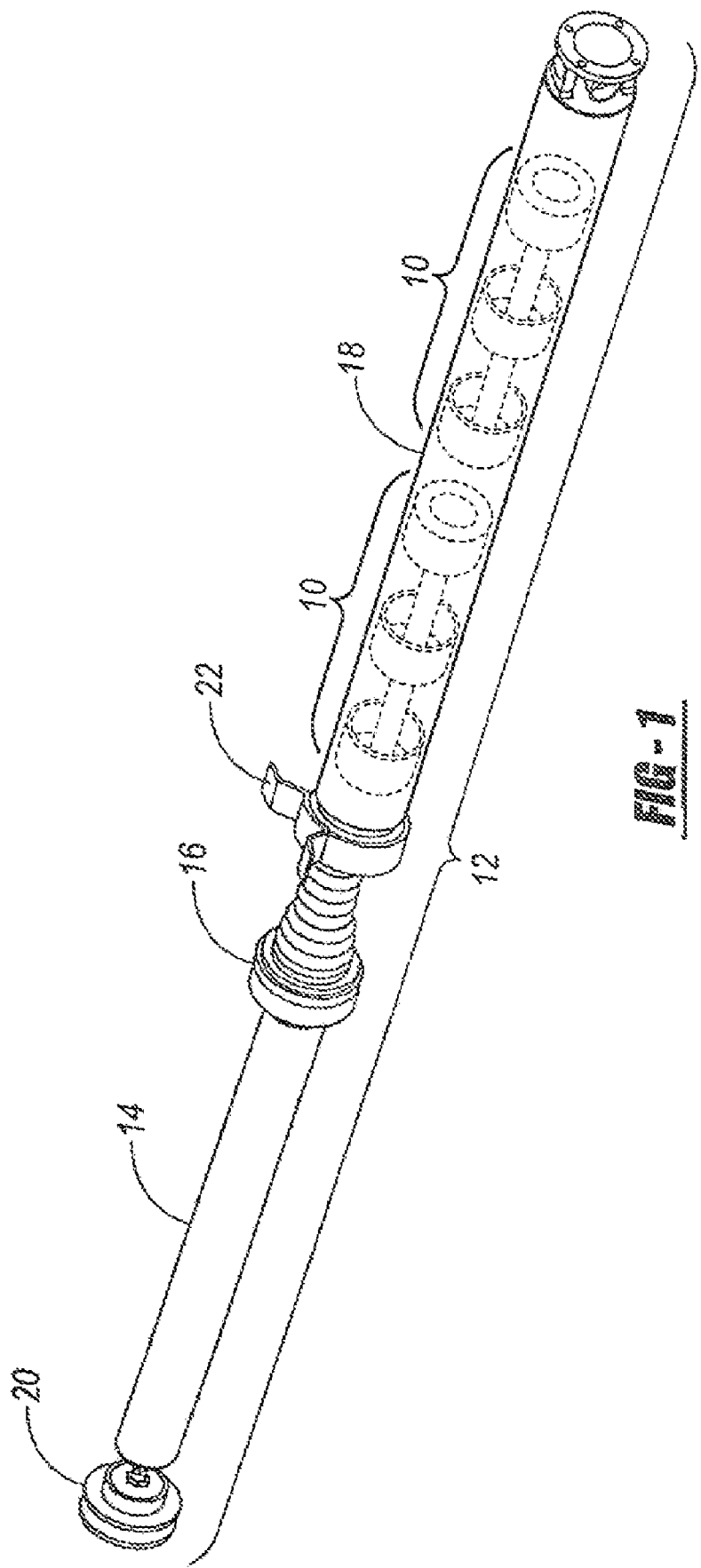
FIG. 1 is a perspective view of a shaft assembly having an absorber of the present invention.

Referring to the drawings, an absorber according to the present invention is generally referred to at 10. Referring specifically to FIG. 1, there is shown generally a shaft assembly 12 of a motor vehicle. Shaft assembly 12 comprises a front propeller shaft (propshaft) 14 shown operatively connected to a constant velocity joint 16 such as, but not limited to, a "VL" style plunging constant velocity joint as understood by one skilled in the art. Constant velocity joints are typically employed where transmission of a constant rotary motion is desired. Plunging joints are typically used in inboard (transmission side) front wheel drive vehicles, and in the propshafts found in rear wheel drive, all-wheel drive and four-wheel drive vehicles. Plunging joints facilitate the interconnection of shafts to change length during operation without the use of splines. The "VL" style plunging constant velocity joint 16 has end motion within the joint with a minimal amount of frictional resistance, since part-spherical rollers are supported on corresponding arms by needle rolling bearings. Connected to the "VL" style plunging constant velocity joint 16 is a rear propeller shaft assembly 18. The rear propeller shaft assembly 18 is further connected to a rear differential (not shown) and may include one or more intermediate components such as, for example, a Cardan joint assembly (not shown) and/or a speed sensing torque device (not shown).

Further, the front propeller shaft assembly 14 is operatively connected to a high speed fixed joint 20. The high speed fixed joint 20 is another type of constant velocity joint generally known in the art and utilized where transmission of torque at high rotational speeds is desired. High speed fixed joints allow articulation to a predetermined angle but can accommodate much higher angles than traditional Cardan joints or other non-CV joints. It should be noted that in all of the joints discussed herein, any of the known plunging or fixed joints may be used or interchanged with either of the joints as described, as there are numerous configurations contemplated for shaft assembly 12 of the present invention.

The high speed fixed joint 20 is connected at one end to a power take-off unit (not shown). In operation the power take-off unit drives and thus transmits torque to front propeller shaft assembly 14 via the high speed fixed joint 20. The front propshaft assembly 14 in the present invention is steel, which provides a very low run-out and a critical speed capacity higher than the second engine order, as understood by one skilled in the art. However, it should be noted that any other metal, ceramic, plastic, composite, and the like might also be used for front propshaft assembly 14. The front propshaft assembly 14 is operatively connected to constant velocity joint 20 by fasteners (not shown) and typically has a flange (not shown) extending outwardly that is connected to constant velocity joint 20 by the fasteners. Further, the shaft assembly 12 is generally secured to the underbody of an automotive vehicle via at least one bracket or other connecting device 22.

Figure 2:
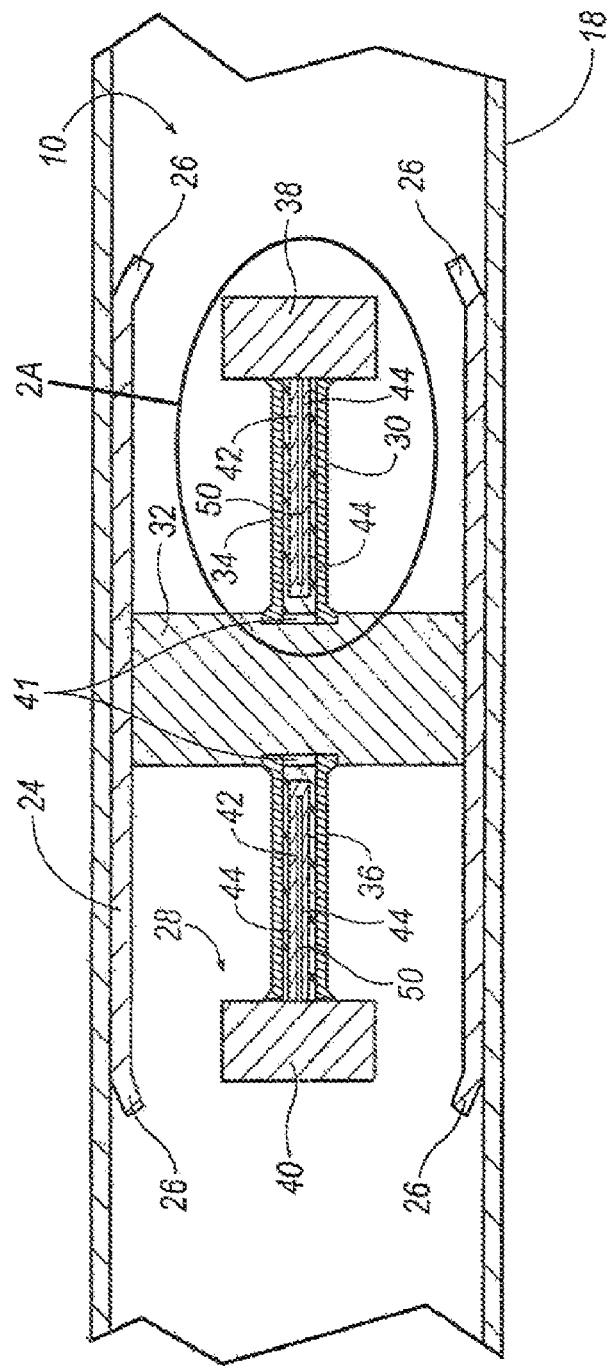
FIG. 2 is a cross-sectional view of the shaft assembly having the absorber disposed therein according to a first embodiment of the present invention.
Figure 4:
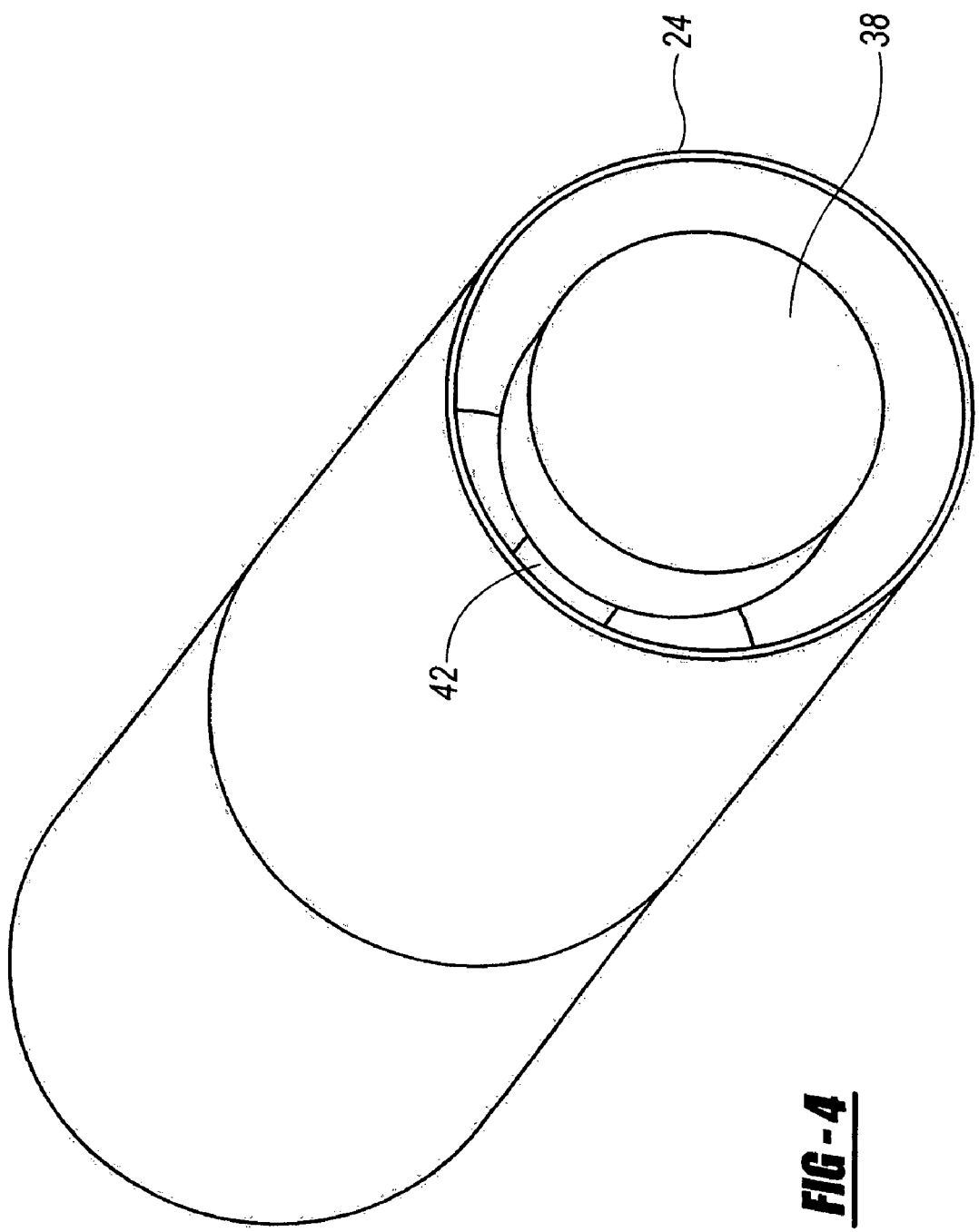
FIG. 4 is a perspective view of the absorber of the present invention.

Referring now to FIGS. 2-4, the absorber 10 according to the present invention includes a tube 24 having a predetermined length and a predetermined diameter. The tube 24 has reduced diameter ends 26 that form ramp-like surface for simple insertion of the absorber 10 within the interior of the propshaft assemblies 14, 18. It should be noted that the absorber 10 may be used on either or both of the front or rear propeller shaft assemblies 14, 18 as shown in FIG. 1. It should also be noted that the absorber 10 could be used on a single propshaft system or any multi-piece propshaft system as understood by one skilled in the art. The tube 24 is made of steel, however, any other metal, ceramic, plastic, composite, and the like may also be used, including but not limited to aluminum. Arranged within the tube 24 is at least one cantilever device 28 and at least one constrained layered damping device 30.

The cantilever device 28 includes a base 32 disposed approximately at a mid-point of the tube 24. The base 32 generally is a disk-like shape with an orifice 41 arranged on each end thereof at, near or centered about the mid-point thereof. In one contemplated embodiment, the orifices 41 include threads 43 for reception of a cantilever tube or rod 34 therein. In one embodiment, the base 32 is made of steel, however, any other metal, ceramic, plastic, composite and the like may also be used for the base 32. The cantilever tube 34, having a predetermined length and predetermined diameter, is secured to the base 32. The cantilever tube 34, having a predetermined length and a predetermined diameter, is secured to the base 32. The cantilever tube 34 is arranged within the orifice 41 on one end of the base 32. A second cantilever tube 36, as shown in the embodiment of FIG. 2, is arranged on the opposite end of the base 32 and is secured thereto. It should be noted that in the embodiment shown the first and second cantilever tubes 34, 36 are used, however, it is contemplated to use only one cantilever tube 34 or 36. The cantilever tubes 34, 36 are made of steel, however, any other metal, ceramic, plastic, composite, and the like may also be used for the cantilever tubes 34, 36. It should also be noted that any fastening techniques may be used to connect the cantilever tubes 34, 36 to the base 32 such as any known chemical bonding techniques, mechanical bonding techniques, welding, and the like are contemplated by the present invention.

A first mass member 38 is arranged and secured to an end of the cantilever tube 34 opposite the base 32. Further, in the embodiment as shown, a second mass member 40 is connected to the second cantilever tube 36 opposite the base 32. The mass members 38, 40 generally have a disk-like shape with orifices (not shown) therein. In one contemplated embodiment the orifices are threaded and receive a threaded end of the cantilever tubes 34, 36 therein. The mass members 38, 40 are made of steel, however, any other metal, ceramic, plastic, composites, and the like may also be used such that an appropriate weight is achieved for the mass members 38, 40. The mass members 38, 40 will operate within the tube 24 by moving radially and generating a response to vibrational frequencies created during operation of the shaft assembly 12. The mass members 38, 40 will move radially and negate the vibrational frequencies of the propshaft assemblies 14, 18 by generating equal and opposite frequencies. The cantilever device 28 will be tuned to a predetermined frequency by adjusting the length of the cantilever tubes 34, 36, by adjusting the diameter of the cantilever tubes 34, 36 or by adjusting the weight of the mass members 38, 40.

The constrained layer damping device 30, according to the present invention, includes at least one damping rod or tube 42 that is arranged within the cantilever tubes 34, 36. As illustrated, it is contemplated by the present invention that at least one damping rod or tube 42 is disposed within each cantilever tube 34, 36. The damping rods or tubes 42 are generally shorter in length than the cantilever tubes 34, 36. The damping rods or tubes 42 are generally surrounded by a damping material 44 that is disposed within the cantilever tubes 34, 36. The damping material 44 in the present invention is generally a resin material and specifically a mastic material. It should be noted that the damping material 44 in the contemplated embodiment is preferably a mastic material, but that any other type of resin, rubber, soft plastic, soft composite, and the like may be used for the damping material 44 within the cantilever tubes 34, 36. The damping material 44 creates a damping layer between inner surfaces of the cantilever tubes 34, 36 and the outside surface of the damping rods or tubes 42. The damping material 44 fills the chamber defined by the inner surfaces of the cantilever tubes 34, 36 and surfaces of the base 32 and mass members 38, 40. In one contemplated embodiment the damping rods or tubes 42 are made of steel, however it should be noted that any other metal, ceramic, plastic, composite, and the like, may also be used, including but not limited to an aluminum material. The damping rods or tubes 42 are secured to an end of the mass members 38, 40 on one end thereof. The other ends of the damping rods or tubes 42 are surrounded by the damping material 44 and do not contact the base 32 or inner surfaces of the cantilever tubes 34, 36. The mass members 38, 40 each have an orifice (not shown) to which the damping rods or tubes 42 are arranged therein to secure the damping rods or tubes 42 to the mass members 38, 40. Any known fastening technique is contemplated to secure the damping rods or tubes 42 to the mass members 38, 40, including but not limited to, forming the damping rods or tubes 42 integrally with the respective mass members 38, 40.

Figure 2A:
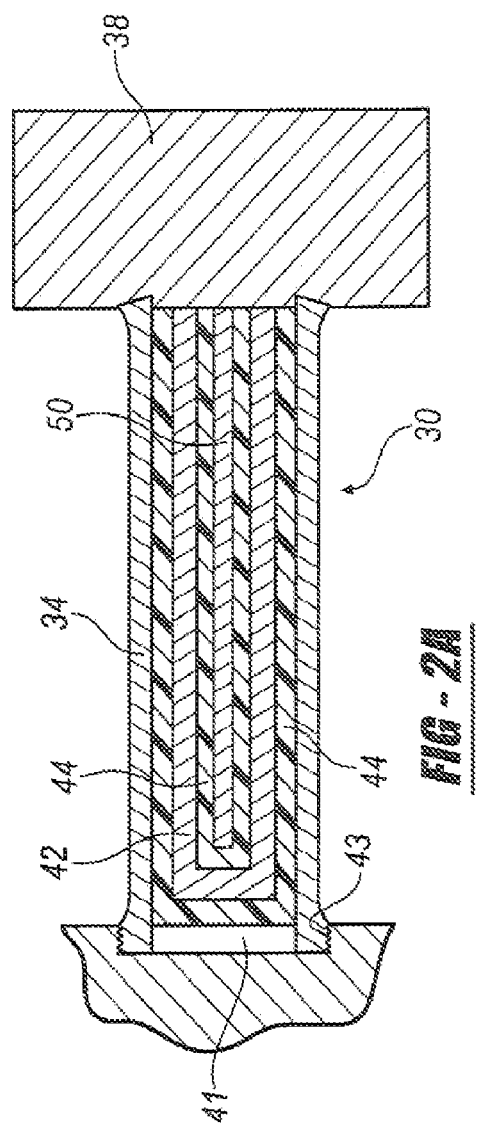
FIG. 2A is an enlarged, partial cross sectional view of a portion of the shaft assembly as seen in FIG. 2.

It is further contemplated to increase the amount of dampening of the absorber 10 by using multiple damping rods or tubes 42 nested or arranged within one another, i.e., like layers of an onion, with each of the multiple damping tubes or rods 42 being surrounded by the damping material 44. Therefore, each of the multiple damping rods or tubes 42 would have a layer of damping material 44 between adjacent damping rod or tubes 42 or cantilever tubes 34, 36. As best seen in FIG. 2A, the constrained layer damping device 30 may further include an inner damping rod or tube 50, being disposed within the damping rods or tubes 42. The damping material 44 is disposed between the inner damping rods or tubes 50, and the damping rod or tube 42. Each of the damping rods or tubes 42 and the inner damping rod or tube 50 would be secured to the mass members 38, 40 via any securing technique or fastening technique. The amount of damping is controlled in the absorber 10 of the present invention via the number of constraining layers, i.e., the number of damping rods and tubes 42 nested within one another and the corresponding layers of damping material 44 therebetween. The amount of damping is also controlled by the thickness of the damping material 44 disposed between the damping rods and tubes 42 and the inner damping rod or tube 50, as well as the length of the cantilever tubes 34, 36 in which the damping device is arranged. Therefore, the multiple layer constrained damping device 30 allows for damping across a wide range of frequencies and vibrations.

Figure 5:
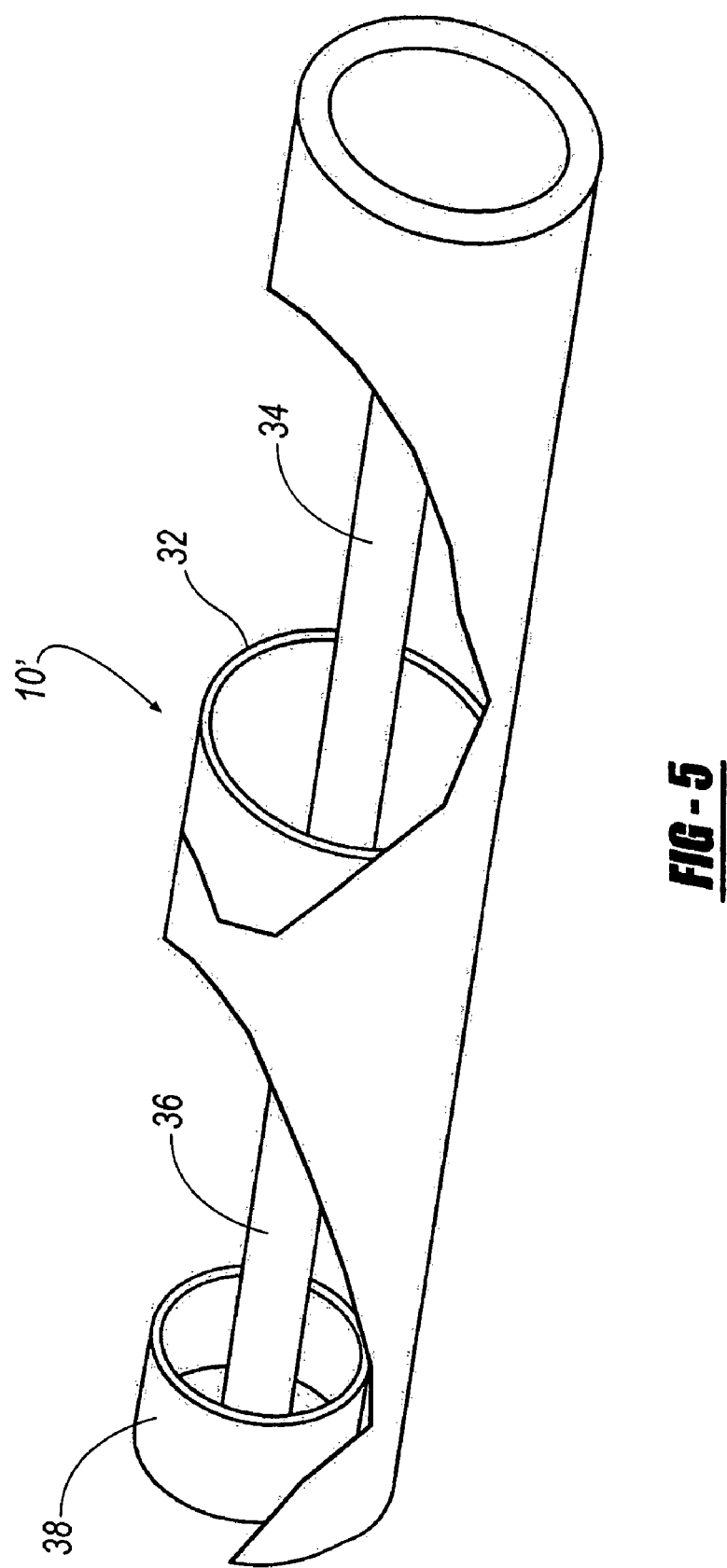
FIG. 5 is a cutaway view of a shaft assembly having an absorber arranged therein according to a second embodiment of the present invention.

Now referring to FIG. 5 a second contemplated embodiment of an absorber 10' is illustrated. The absorber 10' is generally the same as the absorber 10 described above and illustrated in FIG. 2. However, the absorber 10' is disposed directly within the interior of the propshaft assemblies 14, 18 without utilizing the tube 24 of the absorber 10. Therefore, the cantilever device 28 and the constrained layer damping device 30 are also directly arranged within the propshaft assemblies 14, 18 and the base member 32 directly contacts an inside surface of the propshaft assemblies 14, 18. It is also contemplated that absorber 10' functions in the same manner as that described above for the first embodiment illustrated in FIG. 2.

To install the absorber 10 the cantilever tubes 34, 36 are first secured via the threaded orifices (not shown) to the base member 32. It should be noted that any known fastening technique could be used to secure the cantilever tubes 34, 36 to the base member 32. Next the damping rods or tubes 42 are secured to the mass members 38, 40. Then, the damping material 44 is placed within the interior chamber of the cantilever tubes 34, 36 until the chamber is filled. Next, the damping rod or tubes 42 are inserted into the interior chamber of the cantilever tubes 34, 36 until the mass members 38, 40 engage the open ends of the cantilever tubes 34, 36. Then, the mass members 38, 40 are secured to the end of the cantilever tubes 34, 36 via threads or any other known fastening technique. The insertion of the damping rods or tubes 42 expels any excess damping material 44 from within the cantilever tubes 34, 36 thus leaving the cantilever tube 34 filled with damping material 44 and having the damping rods or tubes 42 arranged along a center line of the cantilever tubes 34, 36 and generally surrounded by the damping material 44.

Next, the base member 32 is inserted within the tube 24 such that it is centered along the length of the tube 24. Next, the tube 24 is arranged in a predetermined position within either of the propshaft assemblies 14, 18. The absorber 10 is held in place by a press fit connection or any other known fastening technique. The press-fit connection holds the absorber 10 rotatably fixed within the propshaft assemblies 14, 18. It should be noted that multiple absorbers 10 may be placed in a single shaft assembly 12 or one large absorber 10 may be placed therein depending on design requirements. It should also be noted that in multi-piece shaft assemblies 12, multiple absorbers 10 might be placed in each section or one absorber 10 in each section or simply one absorber 10 in a specific section of the multi-piece shaft assembly 12.

When the absorber 10 includes multiple nested damping rods or tubes 42, each damping rod or tube 42 is filled with the damping material 44 and a corresponding damping rod or tube 42 is inserted therein and then all of the nested damping rods or tubes 42 are connected to the mass members 38, 40. Then, the entire assembly with nested damping rods or tubes 42 and mass members 38, 40 is inserted into the cantilever tubes 34, 36. This permits the damping material 44 to surround each of the nested damping rods or tubes 42 thus creating multiple constrained damping layers for the absorber 10.

Further, in the case of the second embodiment where the tube 24 is not used, the absorber 10' is placed directly within the interior of the propshaft assemblies 14, 18 and the base member 32 is press fit within the interior of the propshaft assemblies 14, 18. It should be noted that any other type of chemical or mechanical bonding may also be used to secure the absorber 10' within the propshaft assemblies 14, 18.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A shaft assembly comprising:
a generally tubular shaft; and
an absorber generally disposed within said tubular shaft, wherein said absorber further comprises:
a cantilever device including a base, at least one cantilever tube with a first end and second end, and at least one mass member, wherein said first end of said at least one cantilever tube is fixedly attached to said base and said second end of said at least one cantilever tube is fixedly attached to said at least one mass member such that said mass member is separated from and spaced distally away from said base; and
at least one constrained layer damping device including at least one of a rod or a tube that is at least partially disposed within said at least one cantilever tube; and
wherein both of said cantilever device and said constrained layer damping device are disposed within said shaft.

2. The shaft assembly of claim 1 wherein said constrained layer damping device further includes a damping material disposed within said at least one cantilever tube.

3. The shaft assembly of claim 2 wherein said damping material is a mastic material.

4. The shaft assembly of claim 2 wherein said constrained layer damping device further includes a plurality of damping layers.

5. The shaft assembly of claim 4 wherein said plurality of damping layers includes at least an inner damping rod or tube arranged within said rod or tube of said damping device and wherein said damping material is disposed between said inner damping rod or tube and said rod or tube of said damping device.

6. The shaft assembly of claim 2 wherein said damping material generally surrounds said rod or tube and fills at least a portion of said cantilever device.

7. The shaft assembly of claim 1 wherein said base is generally disk shaped.

8. The shaft assembly of claim 7 wherein said base includes a first side and a second side, both of said first and second sides including an orifice for receiving said at least one cantilever tube at said first end.

9. The shaft assembly of claim 8 wherein said orifice includes an inner surface, said inner surface being threaded.

10. The shaft assembly of claim 1 wherein said absorber further includes a second cantilever device.

11. The shaft assembly of claim 1 wherein said base is disposed generally at a mid-point of said tubular shaft.

12. The shaft assembly of claim 1 wherein said one of the rod or tube is shorter in length than said at least one cantilever tube.

13. An absorber for use within a tube of a shaft assembly of a vehicle, said absorber comprising:
   a cantilever device disposed within the tube, wherein said cantilever device includes a base; at least one cantilever tube with a first end and second end; and at least one mass member;
   wherein said first end of said at least one cantilever tube is fixedly attached to said base and said second end of said at least one cantilever tube is fixedly attached to said at least one mass member such that said mass member is separated from and spaced distally away from said base;
   at least one constrained layer damping device including at least one of a rod or a tube that is at least partially disposed within said at least one cantilever tube; and
   a damping material disposed within said at least one cantilever tube and generally surrounding said damping device.

14. The absorber of claim 13 wherein said damping material contacts an outside surface of one of said rod or tube and an inner surface of said at least one cantilever tube.

15. The absorber of claim 14 wherein said one of the rod or tube is generally shorter in length than said at least one cantilever tube.

16. The absorber of claim 13 further including a plurality of damping layers that are comprised of at least one inner damping rod or tube arranged within at least one outer damping rod or tube with said damping material disposed between said plurality of damping rods or tubes.

17. The absorber of claim 13 wherein said cantilever device includes: a second cantilever tube including a first end and a second end, said first end secured to said base; and a second mass member secured to said second end of said second cantilever tube.

18. The absorber of claim 13 wherein said damping material is a mastic material.

19. The absorber of claim 13 wherein said base is generally disk shaped.

* * * * *